Feb. 17, 1959 C. S. THAYER 2,874,110
ELECTROLYTIC REDUCTION CELL FOR PRODUCING ALUMINUM
Original Filed Aug. 12, 1950 2 Sheets-Sheet 1

Simulated liquid topography

Current Flow

INVENTOR.
Charles S. Thayer
BY
ATTORNEY

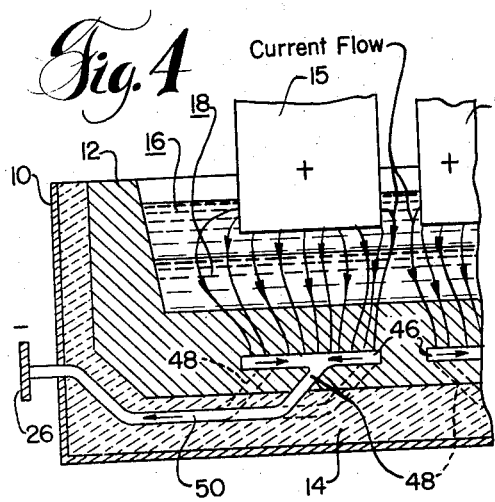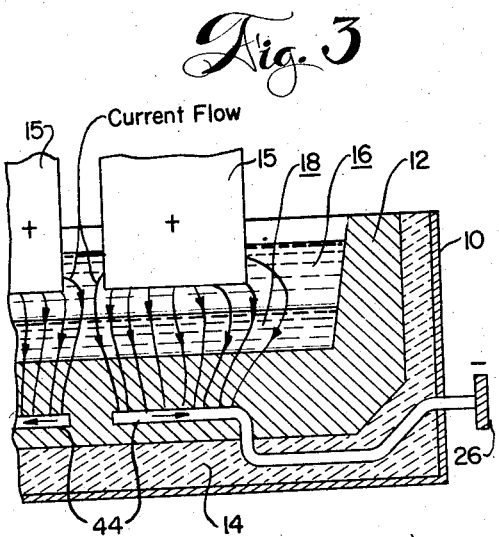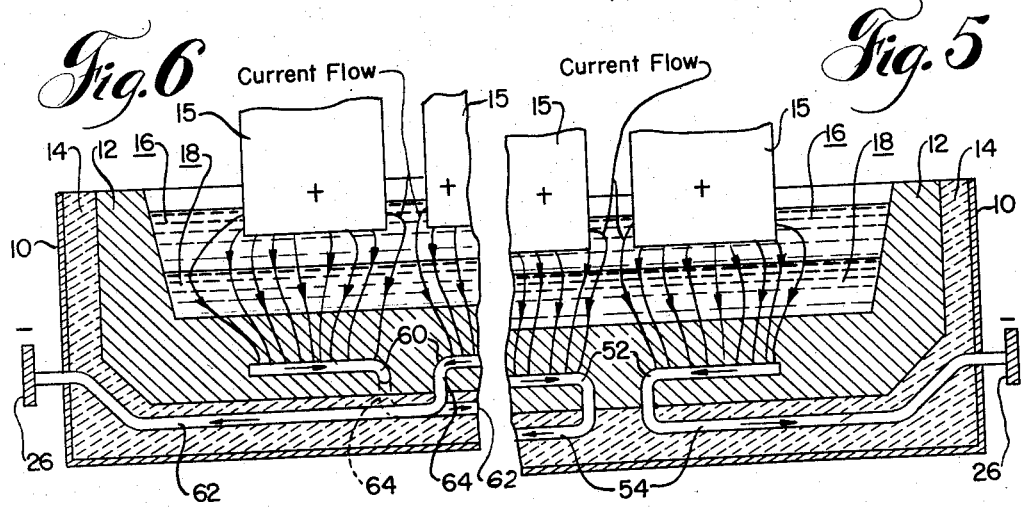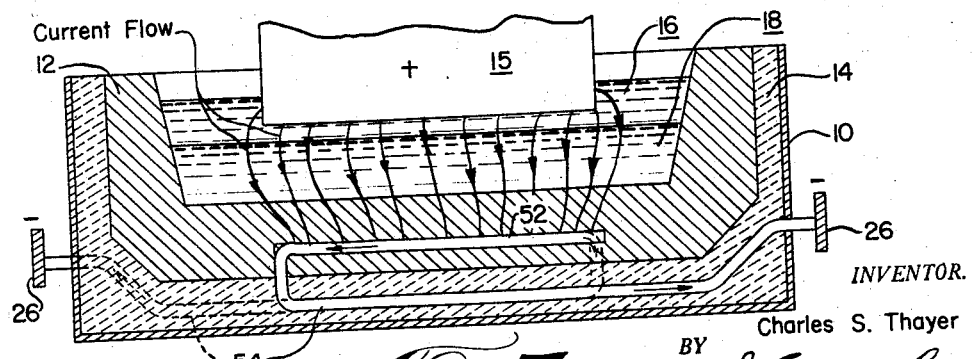

United States Patent Office 2,874,110
Patented Feb. 17, 1959

2,874,110

ELECTROLYTIC REDUCTION CELL FOR PRODUCING ALUMINUM

Charles S. Thayer, Vancouver, Wash., assignor to Aluminum Company of America, Pittsburgh, Pa., a corporation of Pennsylvania Original application August 12, 1950, Serial No. 179,037, now Patent No. 2,824,057, dated February 18, 1958. Divided and this application August 5, 1957, Serial No. 676,118

3 Claims. (Cl. 204—243)

This invention relates in general to the construction and operation of electric furnaces, cells or "pots" suitable for the production of aluminum by the electrolysis of a fused salt bath. This application is a division of my application, Serial No. 179,037, filed August 12, 1950, now Patent No. 2,824,057.

It is a well-known fact that a conductor carrying electric current produces a magnetic field surrounding it and that the direction of the field bears a definite relationship to the direction of the current within the conductor. The direction of the magnetic field is determinable by the "thread rule"; that is, it is the same as the direction of rotation of a screw, having a right hand thread, when the screw is turned to axially move the same in the direction of current flow. The intensity of the magnetic field at any point is proportional to the intensity of the current flow in the conductor and inversely proportional to the distance between the point under consideration and the current-carrying conductor.

It is an equally well-known fact that a force is exerted on a conductor carrying an electric current in a magnetic field provided the field has a directional component at right angles to the bow of current. The force tends to move the conductor at right angles to the direction of both the current and the component of the magnetic field lines at right angles to the current. The direction of the force exerted on a conductor is readily determinable by the "left hand rule," where the index finger is pointed in the direction of current flow in the conductor, the thumb at right angles to the index finger is pointed in the direction of the magnetic field, and the second finger at right angles to the thumb and index finger is pointed in the direction of the force exerted on the conductor. The intensity of the force exerted upon a conductor carrying current in a magnetic field is proportional to the intensity of current flow in the conductor, the intensity of the component of the magnetic field at right angles to the conductor and the length of the path of flow of the current within the magnetic field.

These principles apply whether the electrical conductor be solid or liquid. In the case of fluid or liquid conductors, such as a molten metal pad or pool carrying an electric current within an electrolytic cell, any external magnetic field acting at right angles to the direction of flow of the current reacts to set the molten metal conductors in motion, which may result in circulation of the liquid conducting phase in the apparatus confining the same and cause a departure from an otherwise level surface of the molten metal. This motion and circulation is known as "motor effect" and the development of uneven, more or less stationary crests in the conducting molten metal phase within the apparatus is termed metal "pile-up."

In the electrolytic production of aluminum, the specific gravity of the molten metal layer, lying beneath the molten bath layer, is so near to the specific gravity of the latter that the force required to produce "pile-up" of the metal is much less than it would be if the metal layer was in air; since the force tending to level off the metal surface is only that due to the difference between the specific gravities (metal sp. g.—bath sp. g.) instead of that due to the difference between the specific gravity of the metal and that of the air.

This metal "pile-up" is seriously objectionable as it causes considerable variation in the distance between anode and cathode, over the surface of the metal cathode (pool), and may even cause the molten metal to touch an anode and produce a partial short circuit, thus reducing the efficiency of the cell. Metal "pile-up" is also a condition which, in practice, limits the anode-cathode distance, so that the latter cannot be made as small as would be desirable for the purpose of reducing the voltage lost in forcing the current through the bath, and thus reducing the power consumed per pound of metal produced. Power is a very important item of cost in the production of aluminum, and a reduction in the power required per pound of metal means a definite reduction in cost, and hence is most desirable.

The drawings, forming a part hereof, will serve to illustrate my invention, in which:

Figs. 3 through 6 represent fragmentary sectional elevations through a portion of each of four electrolytic cells in which four embodiments of my invention have been incorporated; and Fig. 7 represents a single anode cell otherwise similar to Fig. 5.

The invention is directed in general to the provision of electrically conducting, resistance heated apparatus with molten contents, such as electrolytic reduction cells for the production of metallic aluminum from alumina. In more specific terms, the invention relates to electrolytic reduction cells in which the direction and intensity of the magnetic fields developed by the anode and cathode conductors serving the cells, as well as the direction and intensity of the electric currents carried thereby and through the molten cathode contents of the cells, are controlled by proper selection and disposition of cathode collector bar arrangements, embedded within the bottoms of the cells, in respect to their physical relationship to cathode bus bars in electrical connection with the embedded collector bars.

Figure 1:
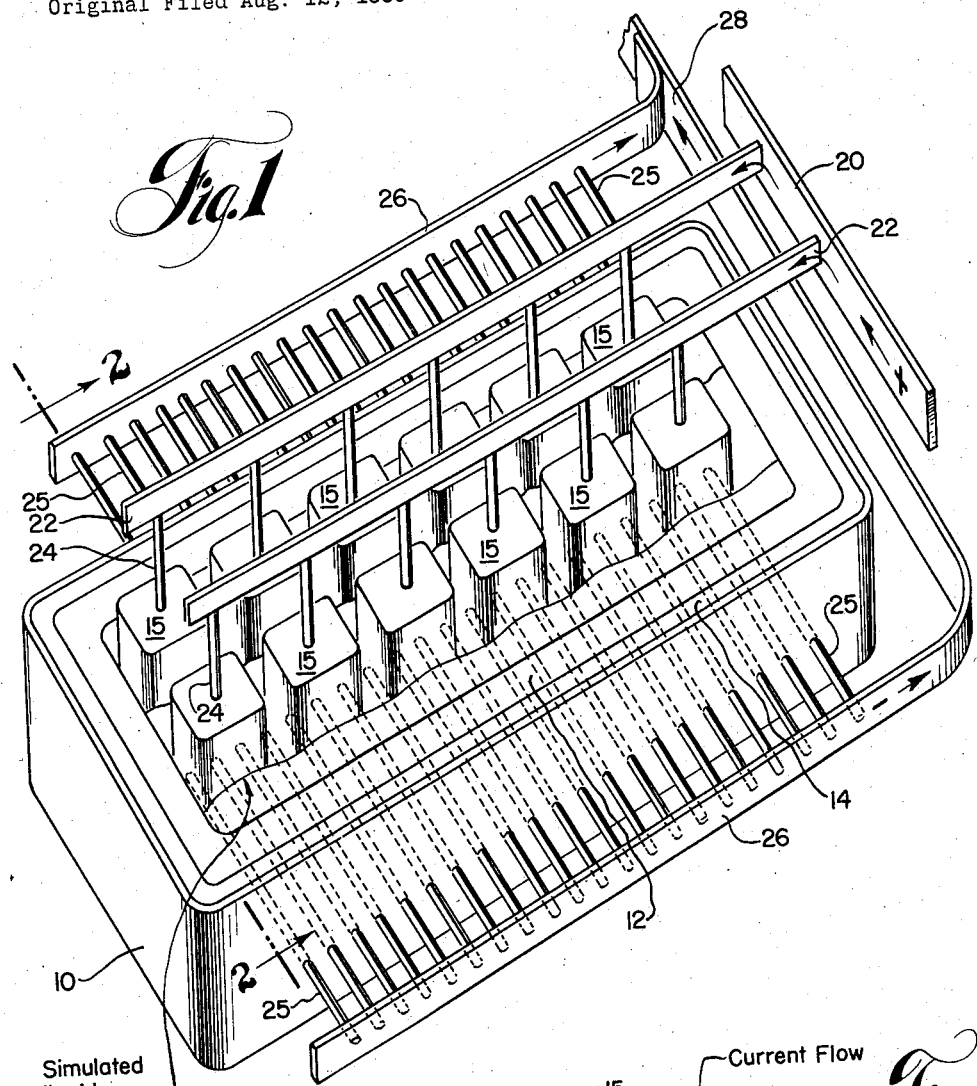
Fig. 1 represents a diagrammatic perspective view of a typical electrolytic reduction pot or cell suitable for the production of metallic aluminum from its oxide.
Figure 2:
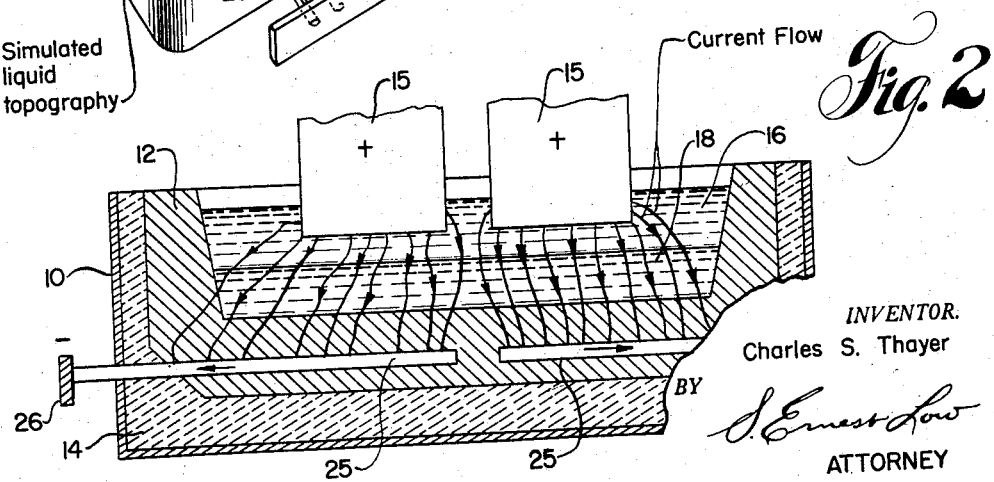
Fig. 2 represents a fragmentary sectional elevation taken on the plane 2—2 of Fig. 1.

Referring to the illustrations, and in particular Figs. 1 and 2, a typical electrolytic cell or pot, suitable for the manufacture of metallic aluminum from its oxide, is shown in perspective and sectional elevation, respectively. It will be observed that the cell comprises, in its essential elements, an outer steel shell 10 having an inner electrically-conductive carbon lining 12 and an intermediate heat and electrical insulating barrier 14. The lining 12 may be built up from prebaked carbon blocks or rammed in situ and thereafter baked. The heat insulating barrier 14 may be constructed from suitable fire brick or crushed insulating material.

Any suitable anodes 15, for introducing electric current, are supported above the cell and depend downwardly into an upper layer of electrolyte 16 which, because of its lower specific gravity, floats or rests upon the cathode layer of molten aluminum 18 which lies in the bottom of the cell cavity. The anodes 15 are preferably rectangular carbon blocks and are supported in such a manner (not specifically illustrated) that they are readily adjustable vertically to maintain proper anode-cathode distance between the normally flat underside of the anodes 15 and the molten metal pad 18.

Any desired arrangement of electrical conductors may be employed to supply current to the anodes, an aluminum or copper bus bar 20, and similar bus bars 22 leading to each of the rows of carbon anodes 15, being here illustrated for this purpose. Electrically-conductive bars or rods 24 of copper not only serve to conduct electric current to the anodes 15, but also to support the same from above the cell.

In the normal operation of the cell thus far described, a fused electrolyte of dissolved alumina in cryolite, represented by the layer 16, electrolyzed by the flow of direct current supplied through the anode system, and the alumina charge is electrolytically reduced to molten metallic aluminum which collects in the bottom of the cell, as represented by the pad or pool 18.

It has been common practice to complete the current circuit through a cell of the type above described by means of a cathode system comprising, in general, the molten metal cathode 18, conductive carbon lining 12 and horizontal collector bars 25 embedded within the carbon lining 12 below the molten metal cathode 18. Collector bars 25, embedded in the carbon lining 12, beneath the respective rows of anodes 15, normally extend laterally through the shell 10 on either side of the cell. The protruding exterior ends of the collectors 25, which are preferably steel or iron bars, are suitably connected by cathode conductor bars 26, of copper, to an aluminum or copper cathode bus bar 28.

In a commercial installation, it is normal practice to arrange a large number of cells or pots in single or multiple tandem rows, in which case the cells are electrically connected in series, with the cathode bus bar 28 of one pot discharging its current into the anode bus bar 20 of the next succeeding pot in the line.

Depending on the direction and density of currents within the liquid conductors and the distribution and strength of the magnetic fields within the pot cavity, the motor effects may be quite vigorous in cells of the type described herein and illustrated in Figs. 1 and 2. Some motion in the bath, which serves to stir it and distribute additions of alumina throughout the fused cryolite during continued operation of a cell, is desirable. However, under the relatively high operating currents (30,000 to 50,000 amperes) employed in cells of the type under discussion, too vigorous agitation of the fluid charge (electrolyte 16, and especially molten metal pad 18) within the cell, and resultant pile-up of the metal pad 18, has been found to give inefficient pot operation, as heretofore described.

In a cell constructed as shown in Fig. 1, the currents carried by buses 22 and 26 set up magnetic fields within the cell cavity containing the molten bath 16 and molten metal pad 18. The fields set up by the bus bars 22 have a generally horizontal direction within the cavity, parallel to the direction of the collector bars 25, while the fields set up by the bus bars 26 have a generally vertical direction in the cavity. All currents flowing within the cell itself and adjacent to it set up their respective magnetic fields. The actual magnetic field direction and strength at any point is the resultant of all magnetic fields having an influence at that point.

In the cell shown in Figs. 1 and 2, the currents which flow in a vertical direction in the liquid conductors within the cell (bath 16 and metal 18) are of relatively low current density and are of short length. Consequently, under the given magnetic conditions, the force causing motion due to their interaction with the magnetic field, is relatively small.

The current passing through the cell, from the anodes 15 to the cathode bus 26, divides itself so as to occupy all possible paths, in inverse proportion to the electrical resistance of such paths. The molten aluminum has by far the lowest specific resistance of the materials through which the current flows, and when a moderately thick layer is present, the cross section presented for a horizontal flow of current is very large. Taking into consideration the relatively high current density in the steel collector bars 25 and the large cross section of the carbon lining 12 as compared with that of the collector bars, it is evident that the path of least resistance is nearly vertically down from the anode to the molten metal pool, then to some extent horizontally toward the side of the cavity, and thence downward into the collector bars, as diagrammatically indicated in Fig. 2. The dimensions of commercial aluminum cells are such that the density of current flowing horizontally in the metal may be relatively high and the length of path relatively long, as compared with the density and length of path of the vertical currents. Such horizontal flow of current in the molten metal, lying in a vertical magnetic field, imparts to the metal a motion which is a function of current and field strengths and directions. Under some conditions this motion is of such intensity as to seriously interfere with efficient and satisfactory operation of the cell. Horizontal fields parallel to the current flow have no effect, and horizontal fields at right angles to the current flow a relatively small one.

It is found by experience that the horizontal flow of the current in a vertical magnetic field is the principal cause of the objectionable motion in the metal. By increasing the thickness of the metal pad the current density in the horizontal flow can be reduced, and this reduces somewhat the metal motion and "pile-up."

For minimum motion it is necessary to reduce to a minimum the vertical component of the magnetic field passing through the molten aluminum. This vertical component is chiefly due to the current in the parallel bus bars 26 and is particularly great at the rear of the pot, because of the increase in current density in bus bars 26 as they approach the rear of the pot, and the effect of the piece of bus 28 passing across the rear end of the pot. This effect can be minimized by arranging matters so that both these bus bars 26 carry the same amount of current; in which case, since they are parallel conductors carrying current in the same direction, their fields tend to partly neutralize each other in the space between them. In fact this neutralization is approximately complete near the center of this space, but is progressively less complete as either side of the cavity is approached.

If the cell cavity shown in Figs. 1 and 2 is relatively narrow, as compared with the total distance between the bus bars 26, the mutual neutralization of the two fields may be nearly complete throughout the cavity. If, however, a wider cell cavity is employed, as is necessary in large cells, the neutralization is incomplete and a substantial vertical component of electromagnetic field remains near the sides of the cavity. In such a case, additional means may need to be employed to minimize the electromagnetic motion of the molten aluminum.

The remaining available means for reducing electromagnetic motion of the molten aluminum is to reduce the length of the path of horizontal flow of the current within the molten aluminum, and if necessary to reduce such horizontal flow to zero; that is, to cause the current flow to be substantiallly vertically downward through the molten metal into the lining 12 of the cell and into the collector bars 25. This may be accomplished by a suitable arrangement or design of the collector bars. A number of arrangements for accomplishing this result are shown in Figs. 3 to 7, inclusive.

In Fig. 3 an embodiment of the invention is illustrated in which cathode collector bars 44 are disposed in direct electrical contact and communication with the cathode-carrying, electrically-conducting carbon lining 12 for the portion of their length immediately below the anodes 15. The remainder of the length of each cathode collector bar 44 is bent downwardly and outwardly into and through the non-electrically-conducting insulation 14 into electrical connection with the exterior cathode bus bars 26.

A substantially T-shaped cathode collector bar system is illustrated in Fig. 4. In this embodiment of the invention, the cathode collector bars comprise a horizontal portion 46 directly below the anodes 15 embedded in electrical contact with the carbon lining 12. The portions 46 of the bars each form the cross bar or head of a T and the bars otherwise complete the T form through the depending legs 48, shown in full line construction running from substantially the mid point of each of the bars 46 and extending downwardly into the non-conducting heat insulation 14. Generally horizontal collector legs 50 extend laterally through the heat insulation into electrical connection with the exterior cathode bus bars 26. This particular cathode collector bar construction has proved very satisfactory in electrolytic cell operation and is the full equivalent of the cathode collector system illustrated in Fig. 3. The legs 48, shown in dotted line construction adjacent the ends of collector bars 46, illustrate modified forms of the collector bar system of Fig. 4, which will be described in more detail hereinafter.

It may be desirable to reverse the usual direction of the electromagnetic motion or motor effect in one or more areas of an electrolytic cell in order to control and/or eliminate the motor effect. I have accomplished this by employing cathode collector bar systems, as illustrated in Figs. 5 and 6, wherein only those features of design and construction that differ from the previously described cells require consideration. In the two embodiments of the invention shown in Figs. 5 and 6, it will be found that the cathode collector bars not only will establish the path of least resistant to current flow in generally vertical lines, but also establish a generally inward current flow towards the central long axis of the pot or cell. This latter feature further eliminates horizontal current flow to the sides of the cell, with its resultant interaction with the vertical magnetic fields. In fact, by establishing not only generally vertical current flow but also a generally inward current flow towards the central long axis of the pot or cell, the force tending to cause motion of the molten aluminum tends to be in the reverse direction from that when the horizontal current flow is toward the sides of the cell.

In Fig. 5 a cathode system is represented in which a horizontal U-bend is imparted to the individual collector bars. Each of the upper legs 52 of the bars is embedded in the carbon lining 12 directly below the anode 15 on that side of the cell containing the lead off conductor portion 54. From the directional current flow arrows, it will be seen that there is the same general path of least electrical resistance established for current flow from the anodes 15 downwardly and inwardly towards the long axis of the cell into the cathode bars 26.

Referring to Fig. 6 it will be observed that the cathode collector bars 60 have been embedded in the carbon lining 12 to serve as conductors disposed on opposite sides of the long axis of a rectangular cell. Actually this arrrangement provides an X-type or crossed collector bar system which tends to establish vertically the inward electric current flow towards the center of the cell. Conductor portions 62 within the insulating layer 14, and connector portions 64 incorporated in the continuous electrical relationship, complete the X-type installation.

In the illustrations and descriptions of the several embodiments of the invention, a double row of anodes 15 has been illustrated in each instance. This arrangement is quite customary where prebaked carbon anodes are employed. The invention, however, has been equally successful in practice with the Söderberg, self-baking electrode where a single anode is generally employed in each cell. A single anode Söderberg installation is illustrated in Fig. 7, the cathode collector bars 52 being installed in the same manner as described for the double row anode arrangement of Fig. 5, the current being led from the single anode 15 through the bath 16, metal pool 18 and cell conductive lining 12 into the collector bars 52 embedded in the conductive lining directly beneath the projected area of the bottom face of the anode, then downwardly and outwardly and otherwise insulated from the lining 12 in their connection to the exterior cathode bus bars 26.

It will also be observed that all of the cathode collector bar systems described above and illustrated in Figs. 3 to 7, inclusive, have been so designated and installed as to insure maximum vertical current flow between the anodes 15 and the respective cathode collector bars. In respect to Figs. 5 and 6, centrally inward, as well as vertical paths of current flow, are established in the metal layer, and lateral outward current flow to the sides of the cell has been diminished, if not entirely eliminated.

Referring further to Fig. 4, the dotted line construction of the legs 48 of the T-form collector bar system is now described. The dotted line construction illustrates alternate locations and connections adjacent either end of the bars 46 for the full line leg 48. Depending on whether the leg 48 is located toward or at the inner or outer end of a collector bar 46, as distinguished from a central connection for the same, either centrally inward, or lateral outward current flow in the metal layer, respectively, will be established to some degree, in addition to the aforedescribed vertical current flow.

It will also be understood that those electrical conducting portions of the various cathode systems illustrated in Figs. 3 through 7, shown as embedded within the heat insulation layer 14, may if desired be disposed outside the cells. In general, it is preferred to employ iron or steel construction for the cathode collector bar structures hereinabove described.

Having described the invention in terms of several specific embodiments of the same, it is to be understood that it is not to be limited to the specific illustrations, except insofar as it is defined in the appended claims.

What is claimed is:

1. An electrolytic cell for producing aluminum from its oxide which comprises a substantially rectangular open top shell having its side walls and bottom lined with an insulating material and an electrically-conductive lining supported on the bottom insulating material to provide a cell cavity for confining a charge of fused electrolyte and underlying molten aluminum pool, an anode depending downwardly into the cell cavity and laterally spaced inwardly from the side walls of the cell cavity, a cathode current-collector system comprising a substantially horizontal cathode bus bar disposed exterior to and adjacent each of two oppositely disposed side walls of the shell parallel to the long axis of the cell cavity, spaced cathode collector bars embedded in the electrically-conductive bottom lining in parallel disposition in respect to the bottom surface area of the anode, said embedded cathode collector bars each having current-collecting lengths disposed within and below the top surface of the electrically-conductive bottom lining and confined to substantially the downwardly projected area of the anode above the same, and an electrical conductor for each embedded cathode collector bar connecting its respective cathode collector bar to one of the exterior cathode bus bars, each electrical conductor extending downwardly from its respective cathode collector bar within the downwardly projected area of the anode into the insulating material below the bottom electrically-conductive lining and outwardly through the said insulating material in its electrical connection with one of the exterior cathode bus bars.

2. An electrolytic cell for producing aluminum from its oxide which comprises a rectangular open top shell having its side walls and bottom lined with carbon to provide a cavity in the cell for confining a charge of fused electrolyte and underlying molten aluminum pad, an anode extending downwardly into said cavity, a cathode collector bar of generally T-section having its head portion substantially horizontally disposed and embedded within and below the top surface of the bottom carbon lining of the cell and being substantially co-extensive in length with substantially the downwardly projected surface area of the anode, the leg portion of said T-section below said head portion extending downwardly into an insulating lining within said shell and underlying said bottom carbon lining, and an electrical conductor in electrical conection with the leg portion of said T-section and a substantially horizontally disposed cathode bus bar located exterior to and adjacent a side wall of the shell, said electrical conductor being embedded within the insulating bottom lining and otherwise out of electrical communication with the cell cavity and its contents.

3. An electrolytic cell for producing aluminum from its oxide which comprises a rectangular open top shell having its side walls and bottom lined with carbon to provide a cavity in the cell for receiving a charge of fused electrolyte and underlying molten aluminum pad, an anode extending downwardly from above said cell into the cavity, a cathode collector bar having a substantially horizontal current-collecting length embedded within and below the top surface of the bottom carbon lining, said current-collecting length being confined to substantially the downwardly projected area of the bottom surface of the anode, and an electrical conductor connected to an end of the current-collecting length of the embedded cathode collector bar and extending downwardly into an insulating lining underlying the bottom carbon lining of the cell and outwardly therethrough into electrical connection with a substantially horizontally disposed cathode bus bar located exterior to and adjacent a side wall of the shell, said embedded length of cathode collector bar and electrical conductor constituting a generally U-section disposed substantially horizontally in respect to the downwardly projected bottom surface of the anode.

No references cited.

UNITED STATES PATENT OFFICE
CERTIFICATE OF CORRECTION

February 17, 1959

Patent No. 2,874,110     Charles S. Thayer

It is hereby certified that error appears in the printed specification of the above numbered patent requiring correction and that the said Letters Patent should read as corrected below.

Column 1, line 37, for "bow" read -- flow --; column 3, line 10, before "electrolyzed" insert -- is --; column 5, line 72, after "Söderberg" insert -- type --; column 6, line 12, for "designated" read -- designed --; line 24, for "toward" read -- towards --; column 7, line 13, for "conection" read -- connection --.

Signed and sealed this 26th day of May 1959.

(SEAL)
Attest:

KARL H. AXLINE
Attesting Officer

ROBERT C. WATSON
Commissioner of Patents